(12) United States Patent
Wu (10) Patent No.: US 6,272,611 B1
(45) Date of Patent: Aug. 7, 2001

(54) COMPUTER DATA STORAGE MEDIUM HAVING A VIRTUAL DISK DRIVE AND MEMORY MANAGEMENT METHOD THEREFOR

(76) Inventor: Yu-Te Wu, No. 42, Yung-Le Wu St., Chiayi City (TW)

( * ) Notice: Subject to any disclaimer, the term of this patent is extended or adjusted under 35 U.S.C. 154(b) by 0 days.

(21) Appl. No.: 09/247,744

(22) Filed: Feb. 9, 1999

(51) Int. Cl.[7] .................................................. G06F 12/00
(52) U.S. Cl. ........................................... 711/173; 711/112
(58) Field of Search ................................. 711/173, 111, 711/112, 163

(56) References Cited

U.S. PATENT DOCUMENTS

| | | | |
|---|---|---|---|
| 5,089,958 | * | 2/1992 | Horton et al. ........................ 395/575 |
| 5,706,472 | * | 1/1998 | Ruff et al. ........................ 395/497.04 |
| 5,826,012 | * | 10/1998 | Lettvin .................................... 395/186 |
| 5,930,831 | * | 7/1999 | Marsh et al. ........................... 711/173 |
| 6,016,536 | * | 1/2000 | Wu et al. ............................... 711/173 |
| 6,088,778 | * | 7/2000 | Ruff et al. ............................. 711/173 |

* cited by examiner

*Primary Examiner*—Kevin Verbrugge
(74) *Attorney, Agent, or Firm*—Townsend and Townsend and Crew, LLP (57) ABSTRACT

A computer data storage medium includes a system disk drive that is configured to have a starting data region with a system drive description area and a starting data area for storing system files, and at least one virtual disk drive that appears as a file name in the system drive description area of the starting data region and that is not allocated with a predetermined amount of memory space.

25 Claims, 5 Drawing Sheets

COMPUTER DATA STORAGE MEDIUM HAVING A VIRTUAL DISK DRIVE AND MEMORY MANAGEMENT METHOD THEREFOR

BACKGROUND OF THE INVENTION

1. Field of the Invention

The invention relates to a computer data storage medium and a memory management method therefor, more particularly to a memory management method in which a computer data storage medium is configured to include at least one virtual disk drive.

2. Description of the Related Art

At present, partitioning schemes are available in the art to permit partitioning of a computer data storage medium, such as a hard disk, a floppy disk or a portable data storage device, into several system disk drives for storing system files therein, and a data disk drive to be commonly shared by the system disk drives, thereby resulting in efficient use of memory space. Moreover, back-up schemes are available in the art so that, when a system file is modified, the initial version of the system file is stored as a back-up file, while the modified version of the system file is stored as the new system file. Thus, when the new system file is corrupted, such as by a computer virus, portions of the new system file can still be recovered due to the presence of the back-up file.

A main drawback of the known back-up scheme resides in that a system file cannot be restored to its initial installed form once the system file has undergone numerous modifications.

A mirror scheme is also available in the art, wherein the contents of a master hard disk are copied into a slave hard disk so that, when the master hard disk is damaged, the contents of the master hard disk are still available due to the presence of the slave hard disk. However, the known mirror scheme does not provide protection against computer viruses since a computer virus written into the master hard disk is also copied into the slave hard disk.

In co-pending U.S. Pat. No. 6,016,536, entitled "Memory Management Method for a Computer With a Hard Disk Drive," and filed by the applicant on Nov. 13, 1997, there is disclosed a memory management method for a computer with a hard disk drive which can provide adequate protection to the hard disk drive against computer viruses and which permits restoration of system files in the hard disk drive to their initial form. In the disclosed memory management method, the hard disk drive is partitioned into at least one system disk drive for storing system files therein, a data disk drive, a system buffer space, and a read/write table. Then, the computer is operated in one of an unrestricted mode, where storing of the system files and modifying of the system files in the system disk drive by the computer are permitted, and a restricted mode, where modified portions of the system files in the system disk drive are stored by the computer in the system buffer space instead of the system disk drive to maintain the system files in the system disk drive in their initial form and where the read/write table is updated by the computer to record addresses of the modified portions in the system buffer space and addresses of portions of the system files in the system disk drive corresponding to the modified portions therein. The computer is enabled to read (or write into) the data disk drive when the read (or write) address is in the data disk drive regardless of whether the computer is operated in the restricted or unrestricted mode.

In the aforesaid memory management method, the flexibility of the computer data storage medium is affected because of the need to partition the same to form a data disk drive. Inefficient use of memory space occurs if a relatively large storage space is allocated for the data disk drive. If the size allocated for the data disk drive is relatively small to minimize waste of storage space, the data disk drive will be easily filled up during use, thereby arising in the need to repartition the computer data storage medium anew.

SUMMARY OF THE INVENTION

Therefore, the object of the present invention is to provide a computer data storage medium that dispenses with the need to partition the same into system and data disk drives while providing adequate protection against computer viruses and permitting restoration of system files in the computer data S storage medium to their initial form.

More specifically, the object of the present invention is to provide a computer data storage medium that is configured to include a system disk drive and at least one virtual disk drive that appears as a file name in a file description area of the system disk drive and that shares free storage space of the computer data storage medium with the system disk drive to result in greater flexibility when the computer data storage medium is in use.

Another object of the present invention is to provide a memory management method for configuring, reading and writing into a computer data storage medium.

According to one aspect of the invention, a computer data storage medium comprises a system disk drive that is configured to include a starting data region having a system drive description area and a starting data area for storing system files, and at least one virtual disk drive that appears as a file name in the system drive description area of the starting data region and that is not allocated with a predetermined amount of memory space.

Preferably, the system disk drive is further configured to include a system buffer file for storing user-modified portions of the system files residing in the starting data area, and a read/write record file for recording addresses of portions of the system files in the starting data area and corresponding to the user-modified portions stored in the system buffer file. The system buffer file appears as a file name in the system drive description area of the starting data region and is not allocated with a predetermined amount of memory space.

Preferably, the virtual disk drive is configured to include a virtual drive description region, a protected data area for storing system files, a virtual drive buffer file for storing user-modified portions of the system files residing in the protected data area, and a read/write record file for recording addresses of portions of the system files in the protected data area and corresponding to the user-modified portions stored in the virtual drive buffer file. The virtual drive buffer file appears as a file name in the virtual drive description region and is not allocated with a predetermined amount of memory space.

According to another aspect of the invention, a memory management method for a computer data storage medium comprises configuring the computer data storage medium to include a system disk drive that has a starting data region with a system drive description area and a starting data area for storing system files, and at least one virtual disk drive that appears as a file name in the system drive description area of the starting data region and that is not allocated with a predetermined amount of memory space.

Preferably, the system disk drive further has a system buffer file for storing user-modified portions of the system files residing in the starting data area, and a read/write record file for recording addresses of portions of the system files in the starting data area and corresponding to the user-modified portions stored in the system buffer file. The system buffer file appears as a file name in the system drive description area of the starting data region and is not allocated with a predetermined amount of memory space.

The memory management method further comprises selectively operating a computer in an unprotected mode, where storing of the system files in the starting data area and modifying of the system files in the starting data area by the computer are permitted, and a protected mode, where the user-modified portions of the system files in the starting data area are stored by the computer in the system buffer file instead of the starting data area to maintain the system files in the system disk drive in their initial form, and where the read/write record file is updated by the computer to record the addresses of the portions of the system files in the starting data area that correspond to the user-modified portions in the system buffer file.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
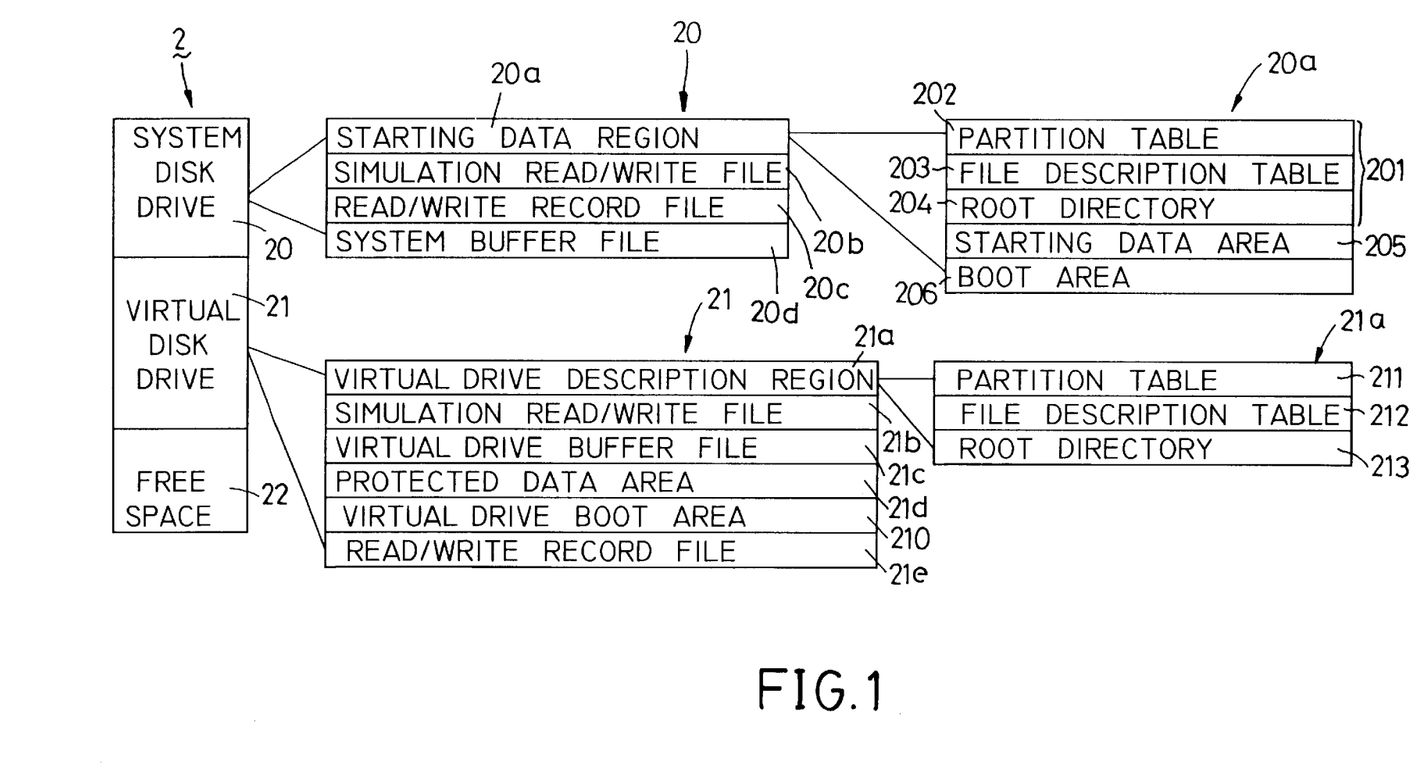
FIG. 1 is a block diagram illustrating the preferred embodiment of a computer data storage medium according to the present invention.

Referring to FIG. 1, the preferred embodiment of a computer data storage medium 2, such as a hard disk, a floppy disk or a portable data storage device, is configured to include a system disk drive 20 and at least one virtual disk drive 21 (only one is shown).

The system disk drive 20 is configured to include a starting data region 20a, a simulation read/write file 20b, a read/write record file 20c, and a system buffer file 20d.

The starting data region 20a is in the form of a contiguous data block in the computer data storage medium 2, and is configured to include a system drive description area 201 for storing at least one of a partition table 202, a file description table 203 and a root directory 204. The file description table 203 is known as a file allocation table (or FAT) in a DOS or Windows operating environment, and is referred to under another name in other operating systems, such as UNIX. The starting data region 20a further includes a starting data area 205 for storing system files resident in the computer data storage medium 2 prior to configuring the latter in accordance with the memory management method of this invention. If the system disk drive 20 is bootable, the starting data area 205 can have a boot area 206 for storing an operating system, such as WIN 98, WIN 95, WIN 3.1, DOS 5.0, etc.

The simulation read/write file 20b is provided so that, when the user forces a computer to write into the system drive description area 201, such as a write command to the partition table 202, the computer can be enabled to execute a write emulation operation by writing into the simulation read/write file 20b instead of the system drive description area 201, thereby maintaining the integrity of information that is present in the system drive description area 201.

The system buffer file 20 disused to store new files for the system disk drive 20 and user-modified portions of the system files residing in the starting data region 20a. When data has yet to be stored in the system buffer file 20d, the system buffer file 20d only appears as a file name in the system drive description area 201, and does not occupy a predetermined allocated amount of memory space.

The read/write record file 20c is provided to record addresses of portions of the system files residing in the starting data region 20a and corresponding to the user-modified portions stored in the system buffer file 20d.

Each virtual disk drive 21 may be a bootable disk drive or a data disk drive. When data has yet to be stored in the virtual disk drive 21, the virtual disk drive 21 only appears as a file name in the system drive description area 201, and does not: occupy a predetermined allocated amount of memory space. Each virtual disk drive 21 is configured to include a virtual drive description region 21a, a simulation read/write file 21b, and a virtual drive buffer file 21c.

The virtual drive description area 21a is used to store at least one of a virtual drive partition table 211, a virtual drive file description table 212 and a virtual drive root directory 213.

The simulation read/write file 21b is provided so that, when the user forces the computer to write into the virtual drive description area 21a, the computer can be enabled to perform a write emulation operation by writing into the simulation read/write file 21b instead of the virtual drive description area 21a, thereby maintaining the integrity of information that is present in the virtual drive description area 21a.

The virtual drive buffer file 21c can be used to store new files for the virtual disk drive 21. When data has yet to be stored in the virtual drive buffer file 21c, the virtual drive buffer file 21c only appears as a file name in the virtual drive description area 21a, and does not occupy a predetermined allocated amount of memory space.

The virtual disk drive 21 may be configured to further include a protected data area 21d. In this case, the virtual drive buffer file 21c can be used to store user-modified portions of system files residing in the protected data area 21d, and a read/write record file 21e is provided to record addresses of portions of the system files residing in the protected data area 21d and corresponding to the user-modified portions stored in the virtual drive buffer file 21c.

If the virtual disk drive 21 is bootable, the protected data area 21d can include a virtual drive boot area 210 for storing a second operating system that is usually different from the one stored in the system disk drive 20.

Figure 2:
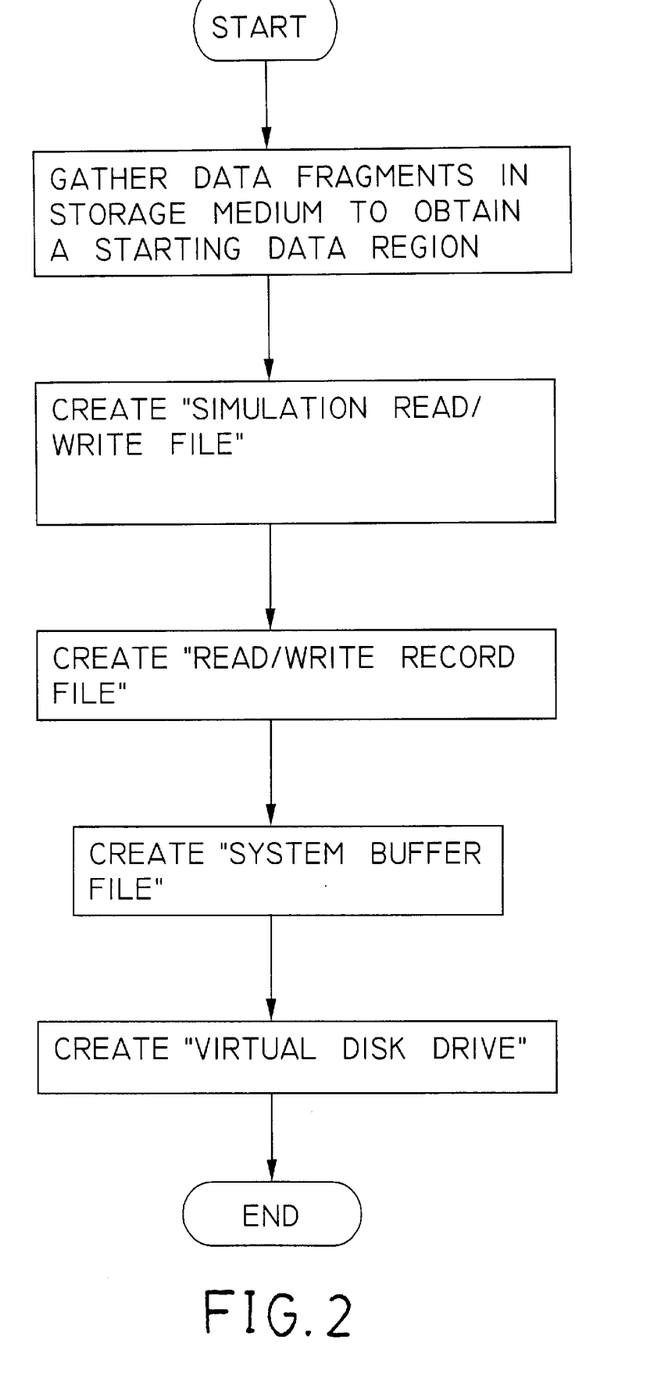
FIG. 2 is a flow chart illustrating how the computer data storage medium of FIG. 1 is configured in accordance with the preferred embodiment of a memory management method according to the present invention.

The remaining free storage space 22 in the computer data storage medium 2 is available for use by the system buffer file 20d of the system disk drive 20, and the virtual drive buffer file 21c of each virtual disk drive 21. FIG. 2 is a flow chart illustrating how the computer data storage medium 2 of FIG. 1 is configured in accordance with the preferred embodiment of a memory management method according to the present invention. The memory management method is to be performed by a standard personal computer that incorporates the computer data storage medium 2. In the preferred embodiment, in order to enable the computer to perform the memory management method of this invention, a plug-in read only memory (ROM) card, in which the computer program for performing the memory management method resides, is mounted on an interface bus, such as an ISA bus, of the computer.

Once the ROM card has been installed on the interface bus, when power to the computer is turned on, the central processing unit of the computer performs a hardware configuration operation in connection with a BIOS memory, as is known in the art. In the prior art, control of the computer is taken over by an operating system after completion of the hardware configuration operation. However, in the memory management method of this embodiment, in view of the presence of the ROM card on the interface bus, the computer is controlled so as to give the user the option of configuring the computer data storage medium 2 before control of the computer is taken over by the operating system.

Figure 3:
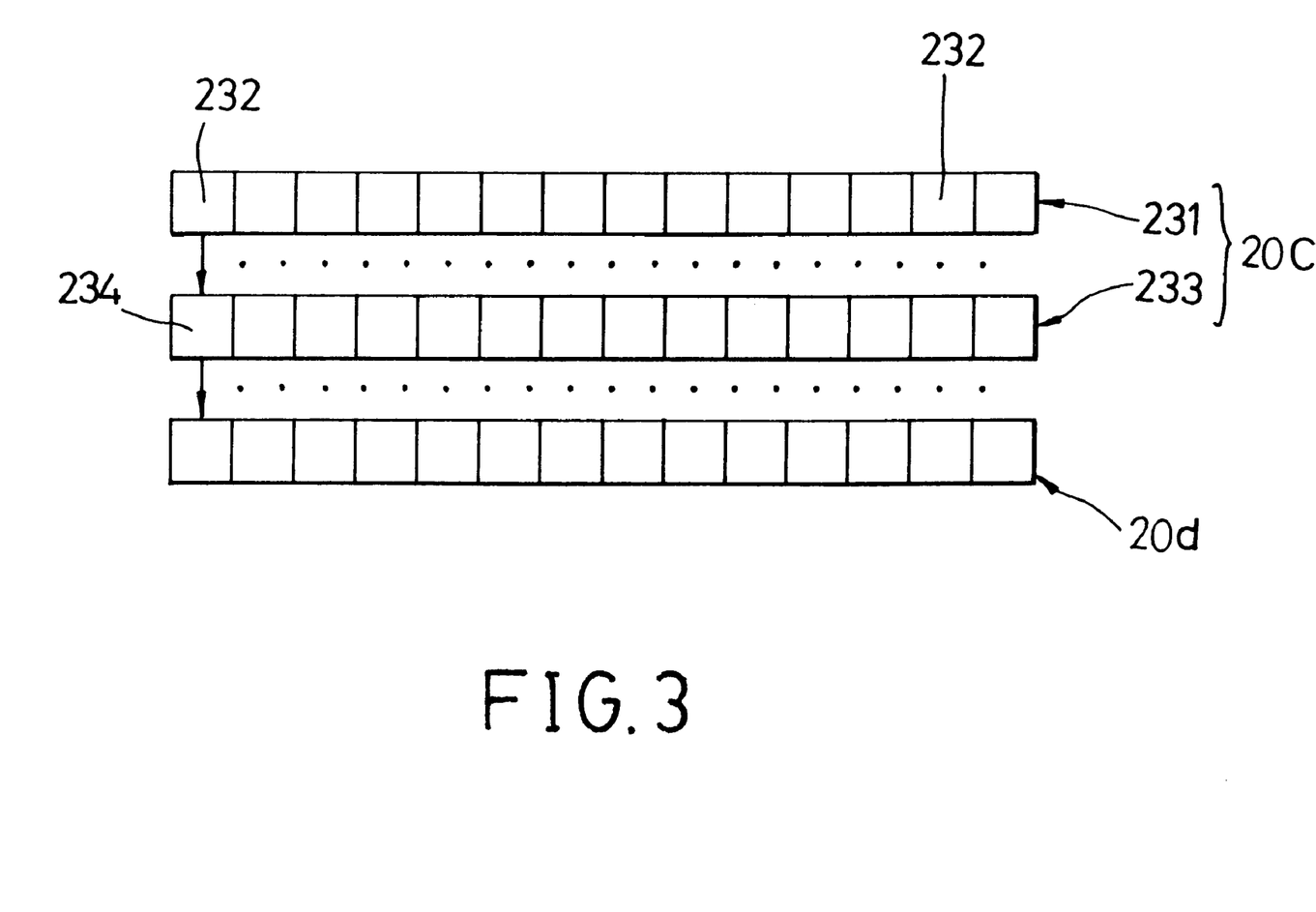
FIG. 3 illustrates the relationship between a read/write record file and a system buffer file of a system disk drive of the computer data storage medium of FIG. 1.

In the present invention, there is no need to partition the computer data storage medium 2 into system and data disk drives with allocated memory sizes. As shown in FIGS. 1 and 2, when configuring the computer data storage medium 2 in accordance with the memory management method of this invention, data fragments initially scattered throughout the computer data storage medium 2 are gathered to obtain the starting data region 20a that is in the form of a contiguous data block located in a starting segment of the computer data storage medium 2 and that includes the starting data area 205 for storing the system files, and the system drive description area 201. Thereafter, the simulation read/write file 20b, the read/write record file 20c and the system buffer file 20d are created to complete the system disk drive 20. As shown in FIG. 3, the read/write record file 20c includes a sector table 231 and an index table 233. Each sector indicating unit 232 of the sector table 231 is a single bit that represents whether a corresponding physical sector (512 bytes or 0.5 kilobytes) of the computer data storage medium has been modified. For a 4-gigabyte computer data storage medium, the sector table 231 occupies approximately 1 megabyte of memory space. Each address recording unit 234 of the index table 233 is a double word for indexing 4 kilobytes of data. For a 4-gigabyte computer data storage medium, the index table 233 occupies approximately 4 megabytes of memory space. Thus, for a 4-gigabyte computer data storage medium, the read/write record file 20c occupies about 5 megabytes of memory space.

In the preferred embodiment, one storage unit of the system buffer file 20d is 4 kilobytes in size. Thus, even if only one byte was modified, this change is stored in the corresponding 4-kilobyte space of the computer data storage medium. Data search of the system buffer file 20d is done with the use of the read/write record file 20c. With the arrangement as such, the space allocated for the read/write record file 20c can be effectively minimized, and the adverse effect on the data searching efficiency of the computer due to the storage of back-up data can be reduced. Moreover, by virtue of the read/write record file 20c and the system buffer file 20d, system files can be frequently updated and restored to their initial form when desired.

Modified data in the system buffer file 20d need not follow the sector sequence of the original data in the computer data storage medium 2. Instead, the arrangement that is in use is the order of modification. For example, if the fifth physical sector of the computer data storage medium 2 is the first to be modified, the first address recording unit 234 of the index table 233 corresponding to the first sector indicating unit 232 of the sector table 231 of the read/write record file 20c will store a double word for "05" therein. The modified data for the fifth physical sector is stored in a storage unit in the system buffer file 20d corresponding to the first address recording unit 234 of the index table 233. If the fifty-eighth physical sector of the computer data storage medium is the next to be modified, the second address recording unit 234 of the index table 233 corresponding to the second sector indicating unit 232 of the sector table 231 of the read/write record file 20c will store a double word for "58" therein. The modified data for the fifty-eighth physical sector is stored in another storage unit in the system buffer file 20d corresponding to the second address recording unit 234 of the index table 233.

Referring again to FIGS. 1 and 2, upon configuring the system disk drive 20, the computer data storage medium 2 is configured to form at least one virtual disk drive 21. In view of the similarities between the system disk drive 20 and the virtual disk drive 21, configuring of the virtual disk drive 21 proceeds in generally the same manner as that for the system disk drive 20. However, the data-gathering step for configuring the system disk drive 20 is replaced by a program-loading step when configuring the virtual disk drive 21. The remaining steps are almost the same and will not be detailed further for the sake of brevity.

After configuring of the computer data storage medium 2 has been completed in accordance with the memory management method of this invention, the computer program of the ROM card enables the computer to give the user thereof the option of operating the computer in a disabled mode, an unrestricted mode, a restricted mode, an auto-restoring mode, and an updating mode.

In the disabled mode, system files can be stored and modified without making any record in the read/write record files 20c, 21e. Restoration of the system files to their initial form is not possible in this mode.

In the unrestricted mode, system files can be stored in the starting data area 205 of the system disk drive 20 and can be modified without making any record in the read/write record file 20c. However, writing into the other parts of the system disk drive 20 and the virtual disk drive 21 is not permitted under this mode to maintain the integrity of information that is present therein. The unrestricted mode of operation is also available for storing and modifying the system files in the protected data area 21d of the virtual disk drive 21. In this situation, writing into the system disk drive 20 and the other parts of the virtual disk drive 21 is not permitted to maintain the integrity of information that is present therein.

In the restricted mode, user-modified portions of the system files in the starting data area 205 or the protected data area 21d are stored in the associated buffer files 20d, 21c to maintain the system files in the starting data area 205 or the protected data area 21d in their initial form. At this time, the associated read/write record file 20c, 21e is updated by the computer to record addresses of portions of the system files in the starting data area 205 or the protected data area 21d corresponding to the user-modified portions stored in the respective buffer file 20d, 21c therein.

In the auto-restoring mode, the read/write record file 20c or 21e and the associated buffer file 20d or 21c are cleared before control of the computer is taken over by the operating system. As such, the system files in the associated one of the starting data area 205 and the protected data area 21d are automatically restored to their initial form. Reading and writing of data in the computer data storage medium 2 then proceeds in a manner similar to that in the aforesaid restricted mode.

In the updating mode, the system files in the starting data area 205 or the protected data area 21*d* are updated with the user-modified portions in the associated one of the buffer files 20*d*, 21*c*, and the associated buffer file 20*d*, 21*c* and the associated read/write record file 20*c*, 21*e* are cleared before control of the computer is taken over by the operating system, thereby updating the system files in the starting data area 205 or the protected data area 21*d*. Reading and writing of data in the computer data storage medium 2 then proceeds in a manner similar to that in the aforesaid restricted mode.

The disabled mode and the unrestricted mode can be generally considered as belonging to an unprotected operating mode since data can be written into the starting data area 205 or the protected data area 21*d* during a write operation of the computer. The restricted mode, the auto-restoring mode and the updating mode can be generally considered as belonging to a protected operating mode since data is written into the buffer file 20*d*, 21*c* during a write operation of the computer.

Once the operating mode has been selected, the computer program of the ROM card enables booting of the computer using the operating system that resides in a selected one of the system disk drive 20 and the virtual disk drive 21.

Figure 4:
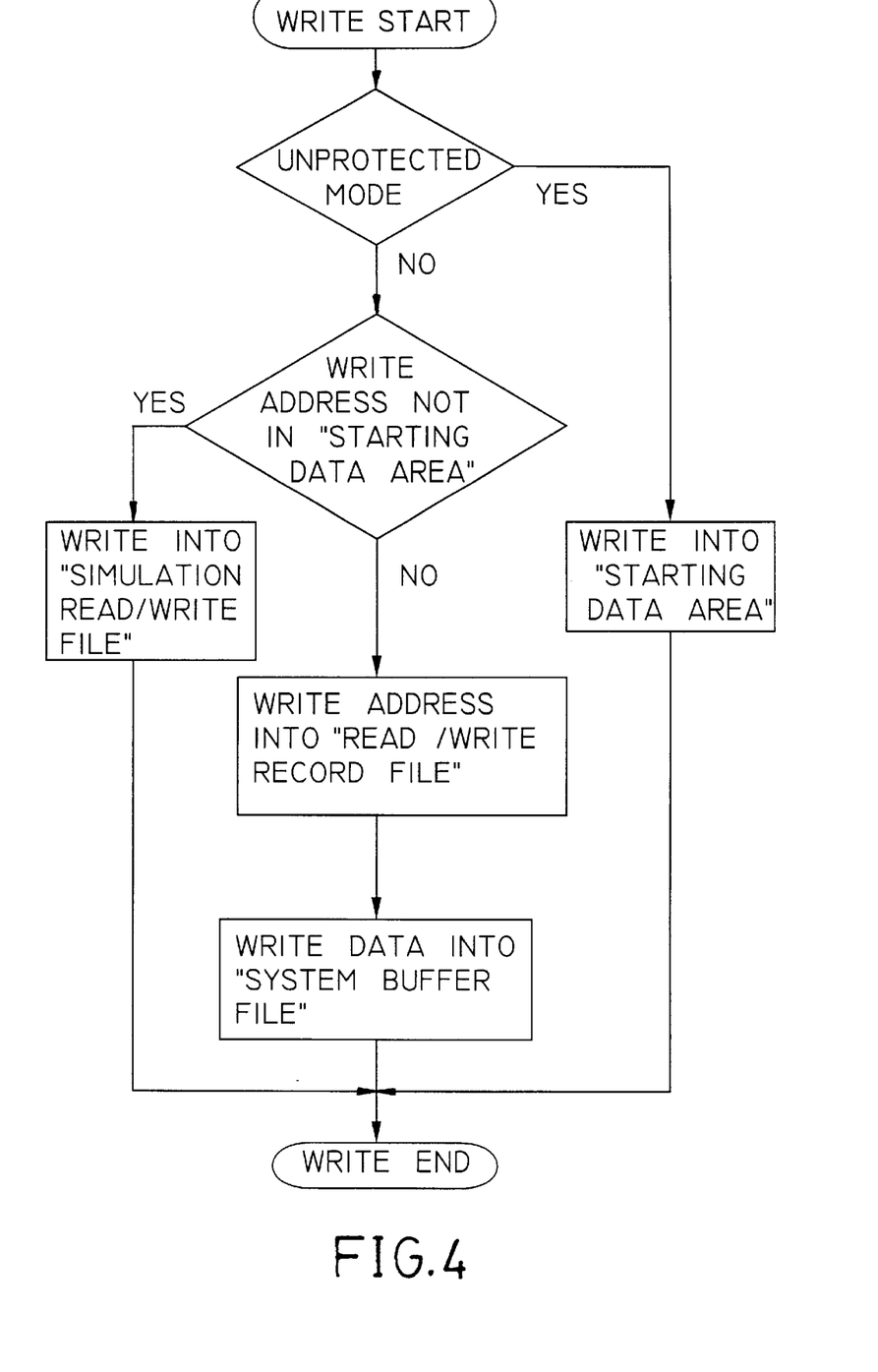
FIG. 4 is a flow chart illustrating a write operation for the computer data storage medium of FIG. 1 in accordance with the preferred embodiment.
Figure 5:
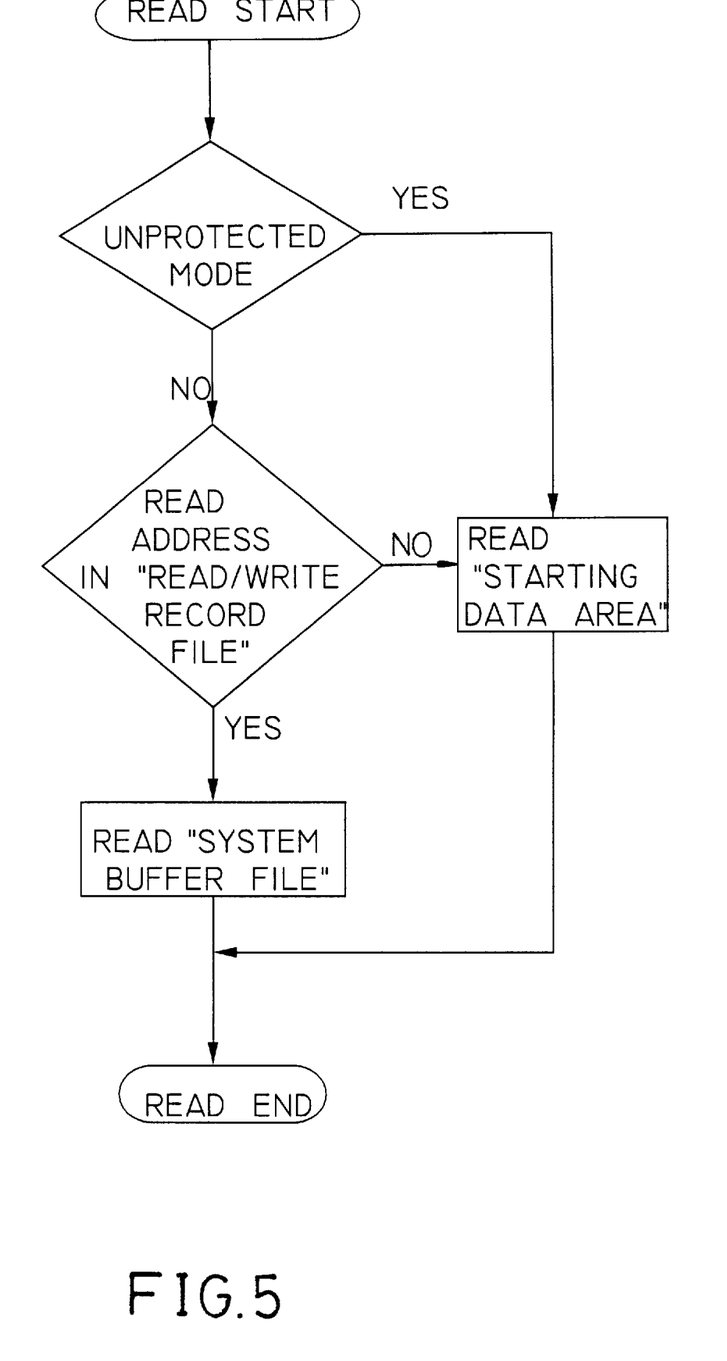
FIG. 5 is a flow chart illustrating a read operation for the computer data storage medium of FIG. 1 in accordance with the preferred embodiment.

FIGS. 4 and 5 are flowcharts that respectively illustrate the write and read operations for the computer data storage medium 2 of FIG. 1. In these flowcharts, it is assumed that the operating system that is in use resides in the boot area 200 of the starting data region 20*a* of the system disk drive 20. The write and read operations for the computer data storage medium 2 when the operating system that is in use resides in the virtual drive boot area 210 of the virtual disk drive 21 is generally analogous to the operations of FIGS. 4 and 5 and will not be detailed herein for the sake of brevity.

As shown in FIGS. 1 and 4, upon detection of a write command for writing into the computer data storage medium 2, the computer is enabled to write directly into the starting data area 205 when the computer operates in an unprotected operating mode for the system disk drive 20. When the computer operates in a protected operating mode for the system disk drive 20, it is first determined if the write address is not in the starting data area 205. If no, the write address is recorded in the read/write record file 20*c*, and the data is written into the system buffer file 20*d*, thereby maintaining the system files in the starting data area 205 in their initial form. If yes, the data is written into the simulation read/write file 20*b*, thereby preventing corruption of the system drive description area 201, the simulation read/write file 20*b*, the system buffer file 20*d*, the read/write record file 20*c*, and the virtual disk drive 21 by a computer virus.

Referring to FIG. 5, upon detection of a read command for reading the computer data storage medium, the computer is enabled to read directly the starting data area 205 when the computer operates in an unprotected operating mode for the system disk drive 20. When the computer operates in a protected operating mode for the system disk drive 20, it is first determined if the read address is recorded in the read/write record file 20*c*. If no, the computer is enabled to read the starting data area 205. If yes, the computer is enabled to read the system buffer file 20*d* to determine the user-modified data corresponding to the read address.

Therefore, in the event that data in the system buffer file 20*d* is corrupted, operation of the computer in the auto-restoring mode will clear the read/write record file 20*c* and the system buffer file 20*d* and restore the computer data storage medium 2 to its initial uncorrupted state. Because the system buffer file 20*d* and the virtual disk drive 21 only appear as file names in the system drive description area 201, they do not occupy a predetermined allocated amount of space in the computer data storage medium 2 to result in enhanced flexibility when the latter is in use.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A computer data storage medium comprising a system disk drive that is configured to include a starting data region having a system drive description area and a starting data area for storing system files, and at least one virtual disk drive that appears as a file name in said system drive description area of said starting data region and that is not allocated with a predetermined amount of memory space, wherein said system disk drive is further configured to include a system buffer file for storing user-modified portions of the system files residing in said starting data area, and a read/write record file for recording addresses of portions of the system files in said starting data area and corresponding to the user-modified portions stored in said system buffer file, said system buffer file appearing as a file name in said system drive description area of said starting data region and not being allocated with a predetermined amount of memory space.

2. The computer data storage medium as claimed in claim 1, wherein the user-modified portions are stored in said system buffer file as storage units, said read/write record file including
   a sector table that has a plurality of sector indicating units to indicate whether a corresponding physical sector of the computer data storage medium has been modified, and
   an index table that has a plurality of address recording units, each of which corresponds to one of the storage units in said system buffer file and stores the address of the portion of the system files in said starting data area that corresponds to said one of the storage units in said system buffer file.

3. The computer data storage medium as claimed in claim 1, further comprising free storage space available for use by said virtual disk drive and said system buffer file.

4. A computer data storage medium comprising a system disk drive that is configured to include a starting data region having a system drive description area and a starting data area for storing system files, and at least one virtual disk drive that appears as a file name in said system drive description area of said starting data region and that is not allocated with a predetermined amount of memory space, wherein said system disk drive is further configured to include a simulation read/write file to permit execution of a write emulation operation, where in case of forced writing into said system drive description area, writing is done in said simulation read/write file instead of said system drive description area to maintain integrity of information present in said system drive description area.

5. A computer data storage medium comprising a system disk drive that is configured to include a starting data region having a system drive description area and a starting data area for storing system files, and at least one virtual disk drive that appears as a file name in said system drive description area of said starting data region and that is not allocated with a predetermined amount of memory space, wherein said starting data area has a boot area for storing an operating system therein.

6. A computer data storage medium comprising a system disk drive that is configured to include a starting data region having a system drive description area and a starting data area for storing system files, and at least one virtual disk drive that appears as a file name in said system drive description area of said starting data region and that is not allocated with a predetermined amount of memory space, wherein said system drive description area has at least one of a partition table, a file description table and a root directory stored therein.

7. A computer data storage medium comprising a system disk drive that is configured to include a starting data region having a system drive description area and a starting data area for storing system files, and at least one virtual disk drive that appears as a file name in said system drive description area of said starting data region and that is not allocated with a predetermined amount of memory space, wherein said virtual disk drive is configured to include a virtual disk drive description region, a protected data area for storing system files, a virtual drive buffer file for storing user-modified portions of the system files residing in said protected data area, and a read/write record file for recording addresses of portions of the system files in said protected data area and corresponding to the user-modified portions stored in said virtual drive buffer file, said virtual drive buffer file appearing as a file name in said virtual drive description region and not being allocated with a predetermined amount of memory space.

8. The computer data storage medium as claimed in claim 7, further comprising free storage space available for use by said virtual drive buffer file and said system buffer file.

9. The computer data storage medium as claimed in claim 7, wherein said virtual disk drive is further configured to include a simulation read/write file to permit execution of a write emulation operation, where in case of forced writing into said virtual drive description region, writing is done in said simulation read/write file instead of said virtual drive description region to maintain integrity of information present in said virtual drive description region.

10. The computer data storage medium as claimed in claim 7, wherein said protected data area has a virtual drive boot area for storing an operating system therein.

11. The computer data storage medium as claimed in claim 7, wherein said virtual drive description region has at least one of a partition table, a file description table and a root directory stored therein.

12. A memory management method for a computer data storage medium, comprising:
configuring the computer data storage medium to include a system disk drive that has a starting data region with a system drive description area and a starting data area for storing system files, and at least one virtual disk drive that appears as a file name in the system drive description area of the starting data region and that is not allocated with a predetermined amount of memory space;
wherein the system disk drive further has a system buffer file for storing user-modified portions of the system files residing in the starting data area, and a read/write record file for recording addresses of portions of the system files in the starting data area and corresponding to the user-modified portions stored in the system buffer file, the system buffer file appearing as a file name in the system drive description area of the starting data region and not being allocated with a predetermined amount of memory space.

13. The memory management method as claimed in claim 12, further comprising selectively operating a computer in an unprotected mode, where storing of the system files in the starting data area and modifying of the system files in the starting data area by the computer are permitted, and a protected mode, where the user-modified portions of the system files in the starting data area are stored by the computer in the system buffer file instead of the starting data area to maintain the system files in the system disk drive in their initial form, and where the read/write record file is updated by the computer to record the addresses of the portions of the system files in the starting data area that correspond to the user-modified portions in the system buffer file.

14. The memory management method as claimed in claim 13, further comprising selectively operating the computer to perform a read operation of the computer data storage medium, including the sub-steps of:
enabling the computer to read the starting data area when the read address is in the starting data area while the computer is operated in the unprotected mode;
enabling the computer to read the starting data area when the read address is in the starting data area and is not recorded in the read/write record file while the computer is operated in the protected mode; and
enabling the computer to read a portion of the system buffer file corresponding to the read address when the read address is in the starting data area and is recorded in the read/write record file while the computer is operated in the protected mode.

15. The memory management method as claimed in claim 13, further comprising selectively operating the computer in an auto-restoring mode, where the computer clears the read/write record file and the system buffer file.

16. The memory management method as claimed in claim 13, further comprising selectively operating a computer to perform a write operation of the computer data storage medium, including the sub-steps of:
enabling the computer to write into the starting data area when the write address is in the starting data area while the computer is operated in the unprotected mode; and
enabling the computer to write into the system buffer file when the write address is in the starting data area while the computer is operated in the protected mode, and to record the write address in the read/write record file.

17. The memory management method as claimed in claim 16, wherein the user-modified portions are stored in the system buffer file as storage units, the read/write record file including
a sector table that has a plurality of sector indicating units to indicate whether a corresponding physical sector of the computer data storage medium has been modified, and
an index table that has a plurality of address recording units, each of which corresponds to one of the storage units in the system buffer file and stores the address of the portion of the system files in the starting data area that corresponds to said one of the storage units in the system buffer file.

18. The memory management method as claimed in claim 16, wherein the system disk drive further has a simulation read/write file, the step of selectively operating the computer to perform the write operation of the computer data storage medium further includes the sub-step of enabling the computer to execute a write emulation operation, where writing is done in the simulation read/write file when the write address is not in the starting data area.

19. The memory management method as claimed in claim 13, further comprising the step of selectively operating the computer in an updating mode, where the system files in the starting data area are updated with the user-modified portions in the system buffer file.

20. A memory management method for a computer data storage medium, comprising:

configuring the computer data storage medium to include a system disk drive that has a starting data region with a system drive description area and a starting data area for storing system files, and at least one virtual disk drive that appears as a file name in the system drive description area of the starting data region and that is not allocated with a predetermined amount of memory space;

wherein the starting data area has a boot area for storing an operating system therein.

21. A memory management method for a computer data storage medium, comprising:

configuring the computer data storage medium to include a system disk drive that has a starting data region with a system drive description area and a starting data area for storing system files, and at least one virtual disk drive that appears as a file name in the system drive description area of the starting data region and that is not allocated with a predetermined amount of memory space;

wherein the system drive description area has at least one of a partition table, a file description table and a root directory stored therein.

22. A memory management method for a computer data storage medium, comprising:

configuring the computer data storage medium to include a system disk drive that has a starting data region with a system drive description area and a starting data area for storing system files, and at least one virtual disk drive that appears as a file name in the system drive description area of the starting data region and that is not allocated with a predetermined amount of memory space;

wherein the virtual disk drive is configured to include a virtual drive description region, a protected data area for storing system files, a virtual drive buffer file for storing user-modified portions of the system files residing in the protected data area, and a read/write record file for recording addresses of portions of the system files in the protected data area and corresponding to the user-modified portions stored in the virtual drive buffer file, the virtual drive buffer file appearing as a file name in the virtual drive description region and not being allocated with a predetermined amount of memory space.

23. The memory management method as claimed in claim 22, wherein the protected data area has a virtual drive boot area for storing an operating system therein.

24. The memory management method as claimed in claim 22, wherein the virtual drive description region has at least one of a partition table, a file description be and a root directory stored therein.

25. A memory management method for a computer data storage medium, comprising:

configuring the computer data storage medium to include a system disk drive that has a starting data region with a system drive description area and a starting data area for storing system files, and at least one virtual disk drive that appears as a file name in the system drive description area of the starting data region and that is not allocated with a predetermined amount of memory space;

wherein the step of configuring the computer data storage medium includes the sub-step of gathering data fragments initially scattered throughout the computer data storage medium to obtain the starting data region that is in the form of a contiguous data block located in a starting segment of the computer data storage medium.

* * * * *